United States Patent [19]

Hayes

[11] 3,960,001

[45] June 1, 1976

[54] BAG FILTER LEAK DETECTION

[75] Inventor: Jimmie R. Hayes, Franklin, La.

[73] Assignee: Cabot Corporation, Boston, Mass.

[22] Filed: June 3, 1974

[21] Appl. No.: 475,749

[52] U.S. Cl. .................................... 73/40.7; 73/38
[51] Int. Cl.² ......................................... G01M 3/20
[58] Field of Search ...................... 73/40.7, 40, 38

[56] References Cited
UNITED STATES PATENTS

| | | | |
|---|---|---|---|
| 2,833,140 | 5/1958 | Austen et al. | 73/38 |
| 3,234,045 | 2/1966 | Larsen | 73/40.7 |
| 3,608,379 | 9/1971 | Brevko et al. | 73/38 |

*Primary Examiner*—Richard E. Aegerter
*Assistant Examiner*—L. Footland
*Attorney, Agent, or Firm*—Jack Schuman; Barry R. Blaker; Lawrence A. Chaletsky

[57] ABSTRACT

A method for the detection of leaks in bag filter apparatus is disclosed wherein there is employed a leak tracer composition comprising a gaseous dispersion of a very light, sub-micron particulate contrast medium. The tracer composition is flowed through the bag filter apparatus and leaks are detected by visual inspection of the filtration elements from the exhaust side thereof.

6 Claims, No Drawings

BAG FILTER LEAK DETECTION

BACKGROUND OF THE INVENTION

The present invention relates generally to cloth dust collector processes and apparatuses wherein dust laden gas streams are conducted through cloth or fabric filtration elements, thereby separating the dust on the collection side of said elements while allowing the gas stream, freed of its dust burden, to pass through to the exhaust side and to be thereafter removed and treated in any conventional or desired manner. More particularly, the present invention relates to an improved detection method for such apparatuses.

In many industrial processes there are produced products or byproducts in suspended dust form, that is to say, in the form of solid particulate matter entrained in a gaseous medium. For instance, furnace and thermal carbon blacks manufactured by the thermal decomposition or partial combustion of hydrocarbonaceous feedstocks are normally first produced in the form of a suspension of the carbon black product entrained in a byproduct flue gas stream. The process stream is conducted from the carbon black forming reactor, cooled and then subjected to product separation and collection. Conventionally, said separation and collection of the carbon black product from the flue gas stream is accomplished by bag filtration thereof.

The general bag filtration and collection technique generally comprises the flowing of a dust laden gaseous stream through one or more porous cloth or fabric bag filtration elements, said elements having a porosity which is, at once, sufficient to allow the gas stream to pass therethrough while being insufficient to allow passage of the dust component. As a result, the dust component is separated from the gas stream and is deposited on the collection side of the filter bags. Means are usually provided by which to periodically remove the collected dust from the bags, such as by repressurization or reversal of the gas flow through the bags, mechanical shaking or vibration of the bags and the like. Upon removal from the filter bags, the separated dust is normally conveyed into a collection hopper and is periodically removed therefrom.

The filter bags are usually composed of woven or unwoven textile materials such as glass, cotton, wool, polyamide or polytetrafluoroethylene fibers. Said filter bags are disposed in one or more compartments of an enclosed bag filter vessel and are affixed to an apertured partition or "cell plate" thereacross which, in essence, divides said vessel into a collection side and an exhaust side and, in consort with the affixed bags, isolates the exhaust side from contact with the dust component introduced into the collection side. In operations the dust laden process stream is introduced into the collection side of the vessel whereupon it flows through the filter bags, thereby to deposit the dust component thereof on the collection side thereof. Meanwhile, the gaseous components of the process stream pass through the filter bags into the exhaust side of the vessel whereupon they are exited and treated or otherwise disposed of in any suitable manner. Generally, the process stream and the bag filtration apparatus are maintained at temperatures above the dewpoint of the process stream in order to mitigate against condensation and occlusion of the filter bags by condensed liquids. During operations, as the dust collects on the filter bags, the pressure drop across the bag filter tends to increase. Thus, it is conventional practice that the filter bags be periodically purged of their respective collected dust burdens upon attainment of a preselected maximum allowable pressure drop across the apparatus, such as by mechanical shaking or by reverse gas flow through the bags. In certain commercially available bag filters the filter bag elements are not, strictly speaking, in the generally tubular "bag" form but rather are envelope-shaped. In some bag filters the filter bags are hung, without substantial support, between an upper hanger plate and the apertured cell plate of the vessel. In other bag filters each filter bag or element is provided with a rigid or semi-rigid cage or screen skeletal support structure and which structure is adapted to prevent stretching or collapse of the filter element. Further details relating to bag filter design and operations may be had by reference to *Chemical Engineers' Handbook*, John H. Perry, Third Edition, 1950, McGraw-Hill Book Company, Inc., pgs. 1029–1034.

During the course of operations of bag filter apparatus there normally ultimately occurs deterioration of one or more of the filter bags to the extent that leaks develop through which dust can escape from the collection side into the exhaust side of the vessel. Leaks can also develop in the isolating components of the bag filter other than the cloth filter bags themselves such as, for instance, by failures or weldments, gaskets, improper filter bag installations and the like. These leaks, of course, are deleterious since they can lower the collection efficiency of the apparatus and can cause great difficulties in the downstream handling or disposal of the dust adulterated or polluted gas stream conducted from the exhaust side of the bag filter vessel. It is, therefore, obviously necessary that such leaks be detected and remedied. In prior art practice, bag filter leak detection has generally been accomplished simply by arduous, detailed and time consuming visual inspection of the passive bag filter after it has been taken off the process line, purged of noxious gaseous components and cooled. Accordingly, the enclosing vessels of bag filters are normally provided with access hatches which allow entry of service and inspection personnel into the collection and exhaust sides thereof. As mentioned, leak detection is conventionally undertaken by personnel who enter the vessel and undertake careful visual inspection of the interior of the bag filter. Over and above the tedious and time consuming nature of the task, such passive visual inspections also often fail to elicit the locations of all significant leak sites with the result that the bag filter, once repaired to the satisfaction of the inspection and service crew, is often discovered to continue to have significant leaks when placed back into service. This, of course, can require that the filter be again taken off the process line, cooled, purged and reinspected. Passive visual inspection of bag filters is often further complicted and made even more difficult by the nature of the process dust collected therein. Thus, bag filters employed in the separation and collection of a dark colored dust, such as carbon black, are particularly difficult to inspect for leaks since the dust residuum in the bag filter tends to mask leak sites and the uniform dull black or grey colorations of the filter bags normally found in such a bag filter mitigates strongly against effective visual inspection thereof. In accordance with the present invention, however, there is provided a method for bag filter leak detection by which the efficiency and effectiveness of leak detection by visual inspection is markedly improved.

OBJECTS OF THE INVENTION

It is a principal object of the invention to provide a novel method for detecting leaks in bag filter apparatus.

It is another object of the invention to provide an efficient and effective bag filter leak detection method.

It is yet another object of the invention to provide a novel improved visual inspection method for bag filter leak detection whereby filter down time and the number of undetected leaks per inspection are substantially reduced.

Other objects and advantages of the present invention will in part be obvious and will in part appear hereinafter.

SUMMARY OF THE INVENTION

In accordance with the present invention, the detection of leaks in bag filter apparatus by visual inspection is facilitated by flowing a tracer composition through the bag filter while visually inspecting the filter from the exhaust side thereof. The tracer composition comprises a gaseous dispersion of a very light fluffy submicron particulate contrast medium.

DETAILED DESCRIPTION OF THE INVENTION

The gaseous component of the leak tracer composition can comprise any gaseous material which is substantially inert with respect to the materials of construction of the bag filter and to the disperse phase contrast medium forming part of the composition. For purposes of convenience and economy as well as for the reason of safety with respect to the presence of inspection personnel, air is a preferred gaseous component for the preparation and use of the leak tracer compositions of the invention.

The disperse phase of the leak tracer composition employed in the method of the invention can be substantially any finely-divided particulate fluffy solid having an average ultimate primary particle diameter of less than about 100 millimicrons, a bulk or apparent density of less than about 10 lbs/ft$^3$ and which particulate solid has a color which contrasts substantially with that of the dust material normally collected in the bag filter under test. By adherence to these criteria it is assured that the particulate contrast medium employed: (1) can be readily formed into and maintained as a gaseous dispersion thereof; (2) will pass, in the disperse phase, through leak sites of even relatively minute dimensions; and (3) will be sufficiently different in color as to be visually observable as it flows in the disperse phase through such leak sites. Specific examples of colloidally sized particulate materials which can be generally employed as the disperse phase of the tracer compositions of the present invention are: fluffy channel and furnace carbon blacks; colloidal silicas such as those produced commercially by pyrogenic high temperature hydrolysis or oxidation of a silicon compound such as silicon tetrachloride; colloidal polymeric powders such as urea-formaldehyde resins, melamine-formaldehyde resins, polyepoxides, polyesters, polyolefins and the like. For detecting leaks in bag filters employed in the collection of carbon blacks, we have found the so-called "fumed" or pyrogenic silicas to represent a preferred particulate contrast medium. Such fumed silicas are normally characterized by having an average ultimate particle diameter of between about 10 and about 50 millimicrons, an apparent density of between about 2 and about 5 lbs/ft$^3$ and a white color in bulk form.

In practicing the method of the invention, the bag filter is prepared for inspection in the conventional manner, that is to say, it is taken off the process line and, if the process stream previously flowing thereto has been substantially heated and/or comprises noxious or explosive components, the filter apparatus is cooled and/or purged free of such components. While the tracer dispersion of the invention can be introduced into the collection side of the bag filter vessel by way of the conventional process line inlet ducting or conduit thereinto, it is generally convenient to open an access hatch into the collection side of the vessel and to station a portable blower or fan at the hatch opening. The tracer composition can then be conveniently formed merely by introducing the particulate tracer medium into the suction of the blower serving the collection side of the filter vessel, said blower thereby entraining the medium in the gas flow therethrough and flowing the resulting cloud of gas-dispersed tracer medium through the bag filter. Inspection personnel stationed in the exhaust side of the enclosing bag filter vessel visually inspect the filter bags and other dust isolating structures of the bag filter as the leak tracer composition flows through the bag filter. A leak is generally expressed as an observable discrete stream of the tracer composition flowing through the leak site into the exhaust side of the vessel or by deposition of the particulate tracer medium on surfaces opposite the leak site.

In a specific example of the leak detection method of the invention, there is employed as the test filter a furnace carbon black plant unit bag filter manufactured by Wheelabrator-Frye, Inc., Mishawaka, Ind. Said bag filter comprises a number of separate filtration compartments. Each compartment has disposed therein 264 cloth filter bags, each said bag having a length of twelve feet and a diameter of 5½ inches. The normal process stream handled by this bag filter is furnace carbon black suspended in byproduct flue gases. During conventional operations, several of the compartments of the bag filter are employed for separation and collection of the carbon black or are maintained on heat load for reserve purposes while one or more remaining compartments are held off-line for inspection and servicing. Accordingly, the following description relates to the inspection procedure concerning one of said filter compartments, it being understood that the same or similar procedure is equally applicable to any of the remaining compartments.

After being shunted off the process line, the filter compartment is purged with an air-rich heat load. The inlet, exhaust and representing dampers of the compartment are then disabled and secured in the shut position. A hatch into the exhaust side of the compartment is opened and there is installed at the opening thereof a portable ⅓ horsepower exhaust fan. Next, a main door into the exhaust side of the compartment and an access hatch into the collection side of the compartment are opened. A 30 horsepower pressure blower is moved into position at the access hatch opening into the collection side of the compartment.

Inspection personnel then enter through the main door into the exhaust side of the compartment and the blower and exhaust fan are placed into operation. In preparing the tracer composition, twenty pounds of a white colloidal pyrogenic fluffy silica, produced by high temperature hydrolysis of silicon tetrachloride, and having an average ultimate particle diameter of about 15 millimicrons and an apparent density of about 2.5 lbs/ft$^3$ are entrained in air by introduction of the silica, in bulk form, into the suction of the blower serving the collection side of the compartment over a period of about 15 minutes. Meanwhile, the inspection personnel, employing artificial lights, inspect the filter bags and cell plate from the exhaust side of the filter and detect leak sites by observing the flow of the tracer composition through such leak sites and/or the deposition of the silica tracer medium on surfaces opposite the leaks. Employing the tracer method of the invention even minute pinhole leaks are ordinarily readily detected and accurately located. Further, the overall time required for inspection of the filter compartment employing the method of the invention averages between 15 and 20 minutes whereas, employing the passive visual inspection procedures of the prior art, said inspections average about 4 hours per bag filter compartment and can require up to about 12 hours per compartment.

The reduction in inspection times normally attendant the practice of the present invention can confer yet additional and significant benefits. Specifically, significant reduction in time required to inspect the bag filter can allow inspection personnel to enter the bag filter enclosure and complete their inspection efforts at substantially higher compartment temperatures than would be the case if relatively longer term exposures of the personnel to the heated environment were necessary. Thus, the present invention generally allows for a substantially less stringent and time consuming cool-down of the bag filter in preparation for its inspection and, in fact, can often avoid the necessity for such cool-down altogether. In turn, reduced cool-down requirements are directly translatable into even further time and energy savings when, subsequent to inspection and servicing, the bag filter is reheated in preparation for its placement back into service.

While this invention has been described hereinbefore with respect to certain embodiments, it is not limited, and it should be understood that variations and modifications thereof may be made which are obvious to those skilled in the art without departing from the spirit or scope of the invention.

What is claimed is:

1. In a method for detection of leaks in bag filter dust collector apparatus comprising visual inspection of the exhaust side of the bag filter dust collector, the improvement which comprises introducing a tracer composition into the collection side and flowing said composition through said bag filter dust collector during the course of said inspection and locating leak sites, said tracer composition comprising a gaseous dispersion of a finely-divided particulate solid tracer medium having an average ultimate particle diameter of less than about 100 millimicrons, an apparent density of less than about 10 lbs/ft$^3$ and a color which contrasts substantially with the color of the dust normally collected in said bag filter apparatus.

2. The improvement of claim 1 wherein sid particulate tracer medium is silica having an average ultimate particle diameter of between about 10 and about 50 millimicrons and an apparent density of between about 2 and about 5 lbs/ft$^3$.

3. The improvement of claim 2 wherein said particulate tracer medium is pyrogenic silica.

4. The improvement of claim 1 wherein the gaseous component of said tracer composition is air.

5. The improvement of claim 1 wherein said tracer composition is performed and introduced into the collection side of said bag filter by stationing pressure blower means adjacent and directed into an opening into the collection side of the bag filter, placing said blower means into operation and introducing said particulate tracer medium, in bulk form, into the suction of said operating blower means.

6. The improvement of claim 1 wherein the dust normally collected in said bag filter apparatus is carbon black and the particulate tracer medium employed in the tracer composition is white pyrogenic silica having an average ultimate particle diameter of between about 10 and about 50 millimicrons and an apparent density of between about 2 and about 5 lbs/ft$^3$.

* * * * *